Aug. 20, 1957 V. HECHLER IV 2,803,751
PHOTOELECTRIC CIRCUIT
Filed Jan. 5, 1951 6 Sheets-Sheet 1
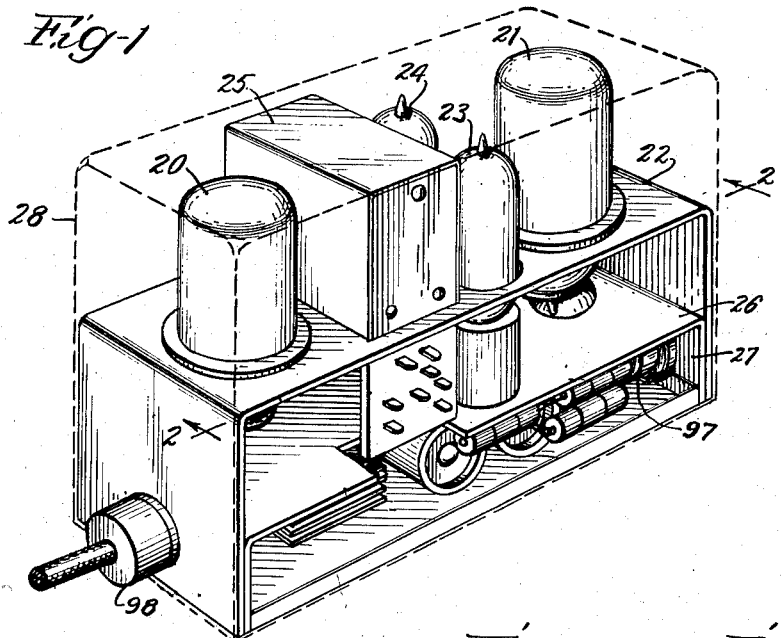
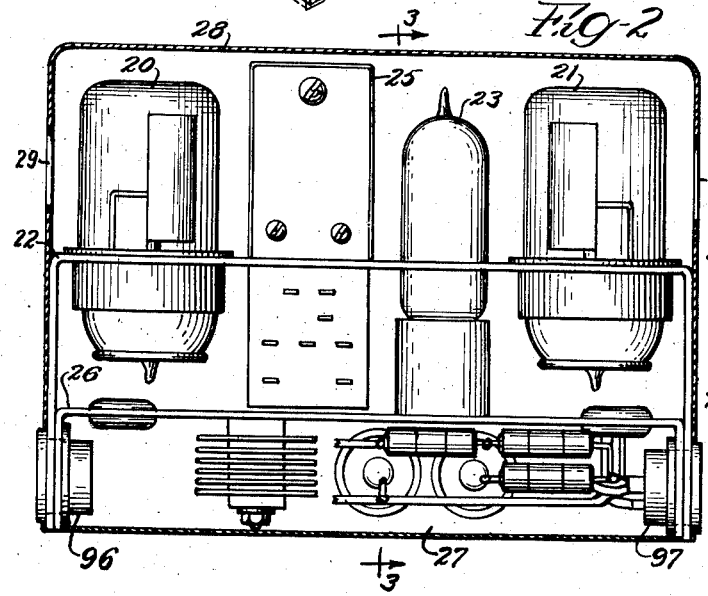
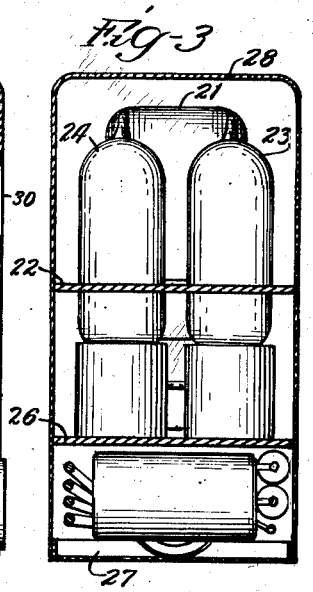
INVENTOR.
Valentine Hechler IV
BY
Mann, Brown and Hanseman
Attys.

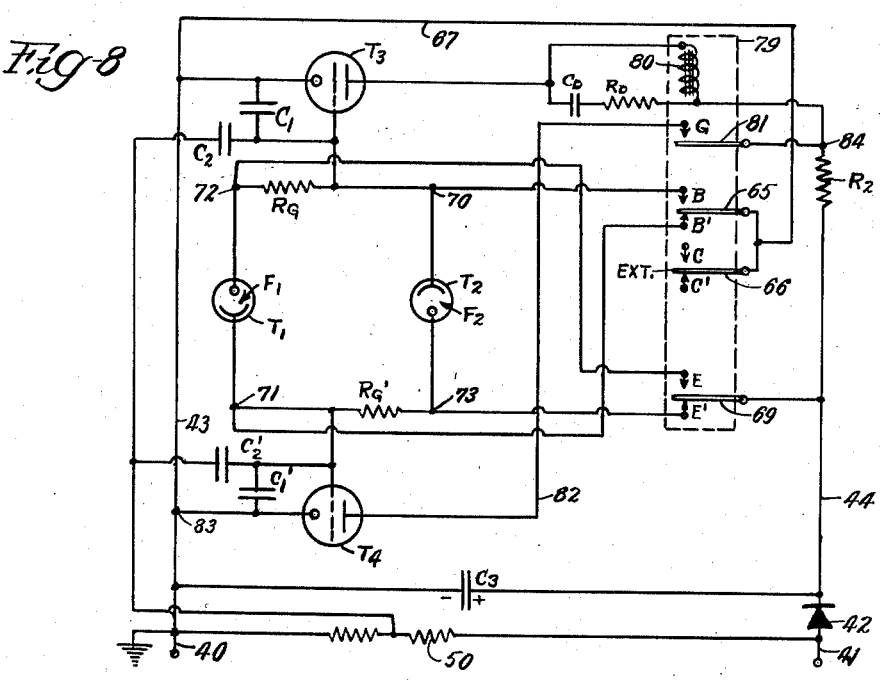
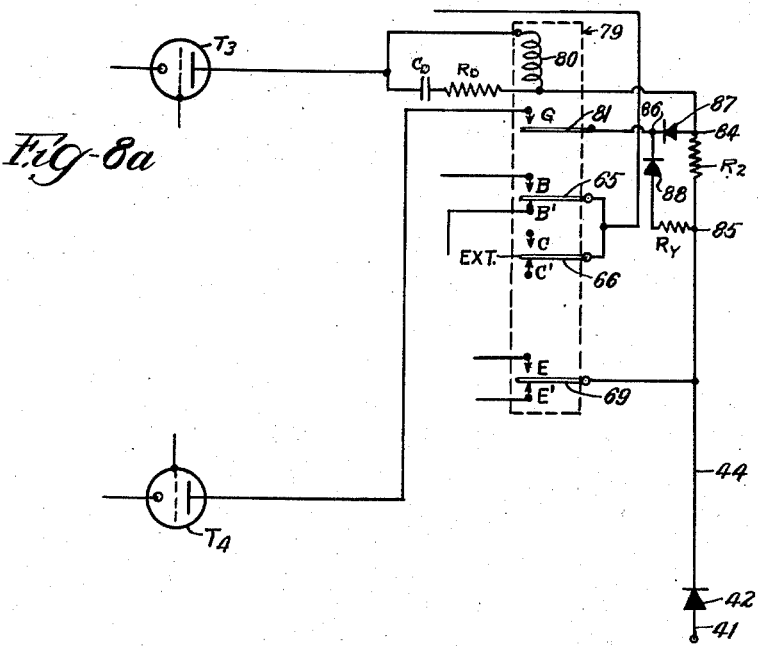

INVENTOR.
Valentine Hechler IV
BY
Mann, Brown and Hausmann
Attys.

United States Patent Office 2,803,751
Patented Aug. 20, 1957

2,803,751

PHOTOELECTRIC CIRCUIT

Valentine Hechler IV, Glencoe, Ill.

Application January 5, 1951, Serial No. 204,627

30 Claims. (Cl. 250—209)

This invention relates to a photoelectric circuit that has a wide variety of uses and applications including photometric comparisons, counting, illumination control, temperature control, and the like. The circuit is characterized by its simplicity, stability and accuracy of control, and may be embodied in a small compact device of relatively low cost.

One of the outstanding features of the invention is that cold-cathode tubes are used for control tubes, with the result that there is little drain on the operating source of electrical energy, and tube life is long; also maintenance costs are held at a minimum.

Other objects and advantages of the present invention include the following:

An adjustable time delay may be incorporated in the circuit to give it stability and to provide the desired time interval between changes in light flux and firing of the control tube; the "on" and "off" levels at which the control tubes operate may be separately adjusted; the light intensity range over which the circuit will operate is exceptionally large; the circuit exhibits a high degree of accuracy with respect to actual performance in relation to theoretical performance; the circuit has high speed operation and with proper designing of the relays, operating speeds of 1/100 of a second are feasible, although actual responsiveness to light changes is much faster, being on the order of .0001 of a second; after actuation of the circuit the recovery period is extremely short so that when the circuit is used for counting it is possible to obtain twenty complete cycles per second, or more, with ease; remote control of the circuit is easily effected, even at long distances from the unit, by merely varying the light intensity of the lamp or other source of illumination to which the unit is exposed; standard power sources may be used, either A. C. or D. C., voltage fluctuation does not interfere with operation of the circuit; the entire circuit may be embodied in a small, compact device occupying 32 cubic inches or less; the circuit is extremely sensitive and is capable of detecting changes in illumination comparable to the illumination of starlight; the circuit and its components are rugged both mechanically and electrically and are unaffected by vibration; by a proper selection of photosensitive materials used in the phototubes, the unit can be made responsive to any desired portion of the light spectrum; the unit may be made responsive to both increasing or decreasing light conditions; a unit embodying this invention draws substantial current only during actuation of the device and requires very little standby power; and the circuit employs balance with the consequent advantages of eliminating errors due to changes in circuit components and conditions.

Still other objects are related more to the mechanical construction of the device and to the relay circuits employed in conjunction therewith, and among these objects and advantages are the following:

The arrangement of the photocells on the chassis is such that "on" or "off" operation may be obtained merely by turning the set through 180°; the sensitive portions of the circuit are mechanically separated from and magnetically and electrostatically shielded from the other components of the unit; the unit embodies a safety feature of preventing removal of the cover until the power plug has been pulled out of its socket; the unit is of extremely small size and may be encased within a waterproof jacket provided with window openings to the phototubes, so that the unit's operation is completely independent of atmospheric conditions; a power plug receptacle is provided at each end of the unit so that the power attachment can be conveniently made from either end of the unit to facilitate end-to-end rotation of the unit for exposure of the desired tube to the light source that is to control operation of the unit; and various relay combinations are used to effectively shift control of the unit from one control tube used for "off" to "on" operation to another control tube used for "on" to "off" operation.

These and other objects and advantages will become apparent as the disclosure proceeds and the description is read in conjunction with the accompanying drawings, in which—

Figure 1 is a perspective view showing the chassis for a preferred form of the invention;

Figure 2 is a vertical sectional view taken on the line 2—2 of Figure 1;

Figure 3 is a vertical sectional view taken on the line 3—3 of Figure 2;

Figure 7:
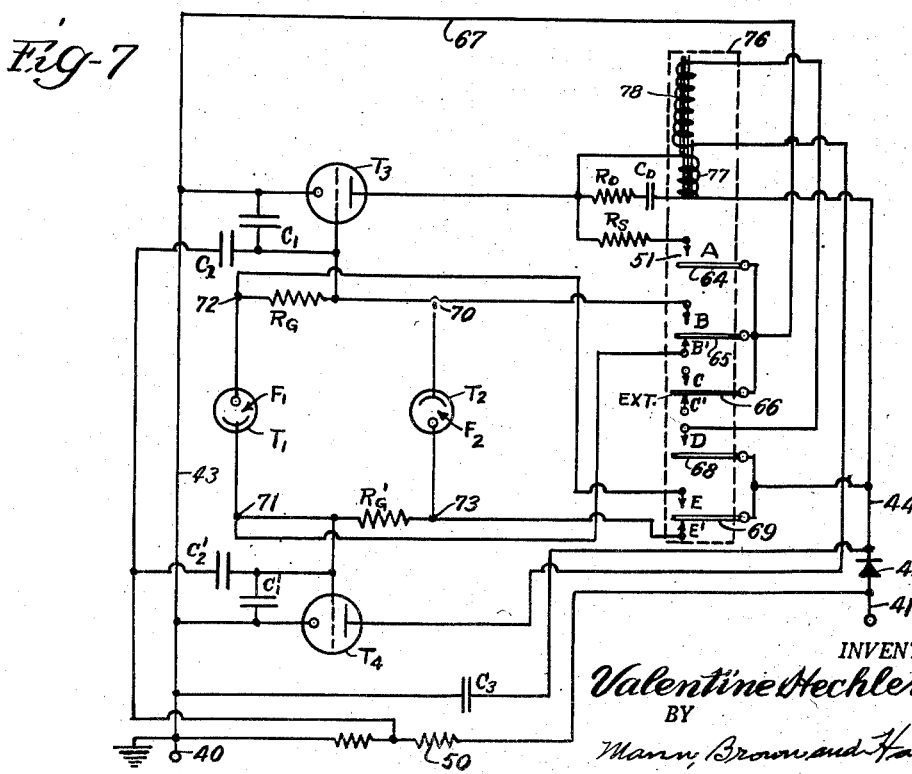
Figure 9:
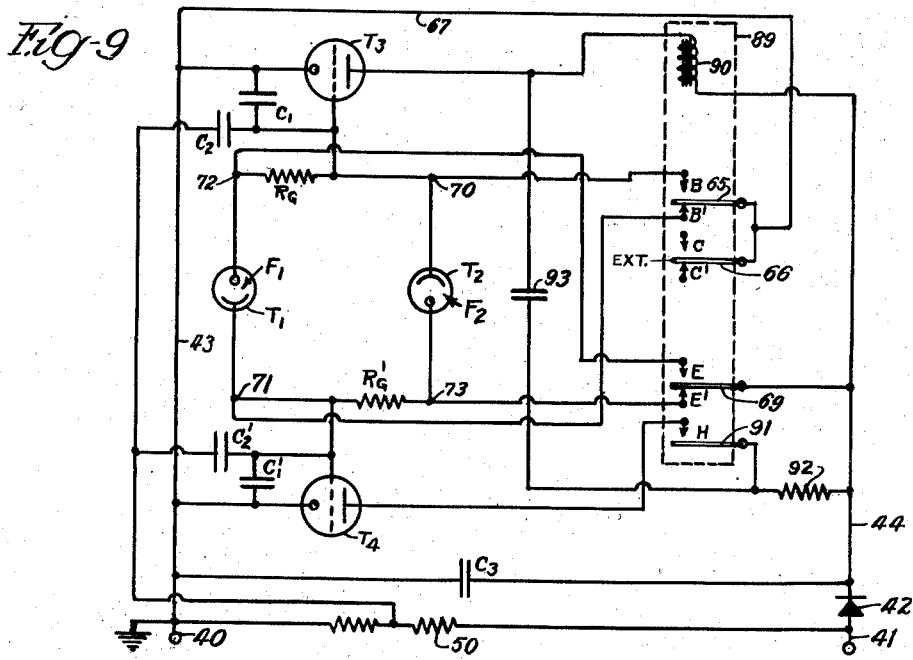
Figure 9A:
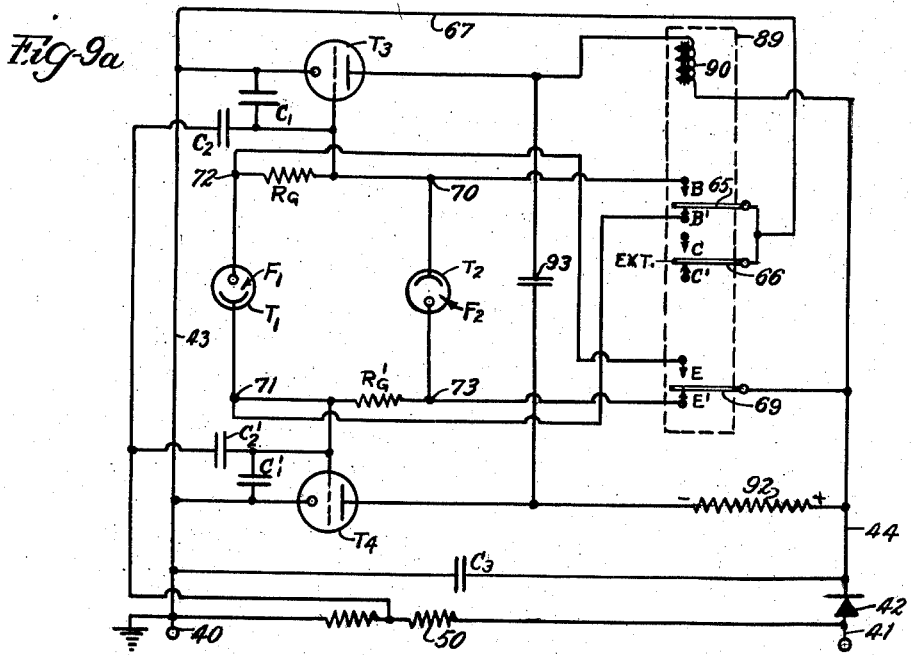

Figurt 6 shows one embodiment of the complete circuit utilizing multiple relays to effect control of the circuit;

Figure 7 shows single relay operation of the circuit employing multiple coils on the relay;

Figure 8 shows single relay operation with a single relay coil;

Figure 8a shows how additional components may be incorporated in the circuit of Figure 8;

Figure 9 shows how the circuit may be operated with a single relay and coil with a parallel thyratron control circuit;

Figure 9a shows a modification of the circuit of Figure 9; and

Figure 10:
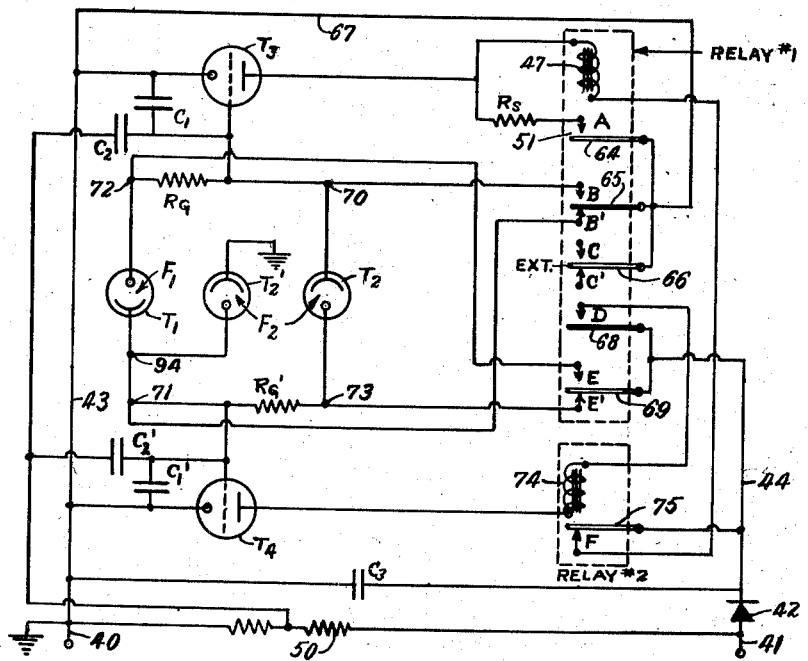

Figure 10 shows a modified phototube circuit in which a third phototube is used to enable different changes in the levels of illumination to effect 'on" and "off" operation.

It should be understood that the illustrations and the drawings and the following description of certain preferred forms of the invention are for the purpose of complying with section 4888 of the Revised Statutes, and that the invention may be variously embodied within the scope of the appended claims.

GENERAL ORGANIZATION

Referring to Figures 1 through 3, it will be seen that my invention may be embodied in a small, compact unit in which phototubes 20 and 21 are mounted on opposite ends of a U-shaped chassis 22, with control tubes 23 and 24 and a relay, generally designated 25, mounted intermediate the phototubes 20 and 21. The other physical components of the circuit, with the exception of the power supply, are mounted between the chassis 22 and a shelf 26 with the power supply, generally indicated at 27, being mounted beneath the shelf 26.

The entire unit is enclosed within a cover 28 having windows 29 and 30 for exposing the phototubes 20 and 21 to the desired light sources.

Details of the physical structure will be more fully described in a subsequent portion of the specification.

EXPLANATION OF CIRCUIT

Figure 4:
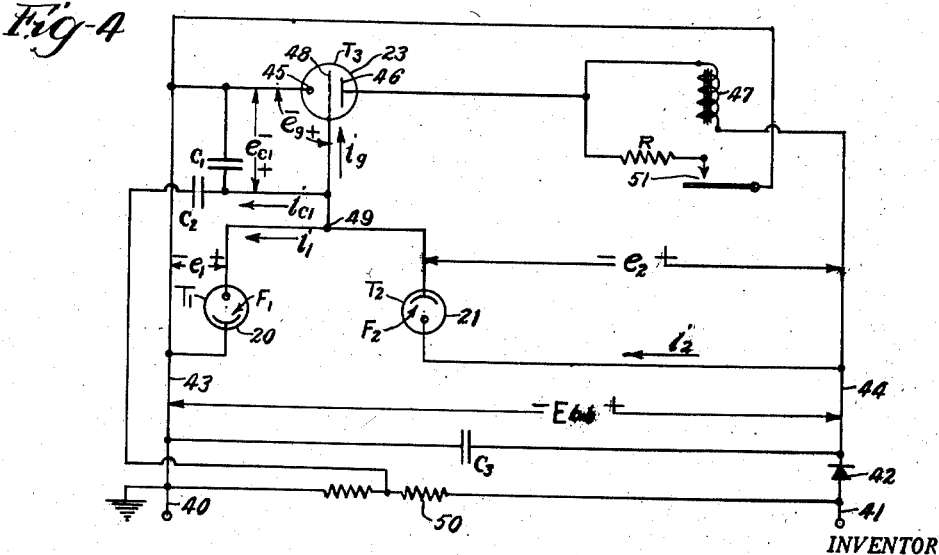
Figure 4 shows a fragmentary portion of the circuit that is used in the various embodiments of this invention, and which will be used to explain the theory of operation of the device.

For an understanding of the principles that underlie the circuit of this invention, it is convenient to take but a portion of the circuit, such as shown in Figure 4, and analyze its components and operation.

The purpose of the circuit is to provide two balanced phototubes which are connected in series to a suitable D. C. source of electrical energy, and to so connect these phototubes to the control element of a cold-cathode tube, that whenever the level of illumination on one of the phototubes falls below some predetermined value, or some predetermined level of illumination relating to the other phototube, and this condition prevails for some predetermined period of time, the cold-cathode tube will fire to thereby actuate any desired external circuit.

Additionally, my invention provides in various adaptations thereof a means for terminating current flow through the cold-cathode tube simultaneously with the operation of the relay and setting up a suitable circuit for enabling a predetermined rise in illumination on the first phototube to restore the circuit to its initial state, in which it is again responsive to decreases in the illumination falling on the first tube.

Referring now to Figure 4, it will be seen that the circuit is energized from a suitable source of alternating current, indicated by the leads 40 and 41, preferably 110 volts, 60 cycle, and this current is rectified by a rectifier 42 in combination with a condenser $C_3$. Hence, the leads 43 and 44 constitute opposite sides of a D. C. source of electrical energy, with the lead 43 being the negative side, and the lead 44 being the positive side.

The phototubes 20 and 21 (here for convenience in subsequent analysis, designated $T_1$ and $T_2$, respectively) are connected in series across the D. C. leads 43 and 44, with the anode of tube $T_1$ connected to the cathode of tube $T_2$ and the cathode of $T_1$ and the anode of $T_2$ connected to leads 43 and 44 respectively. The cold-cathode tube 23 (here for convenience referred to as $T_3$) is also connected across the D. C. leads 43 and 44, the cathode 45 being connected to the negative lead 43, and the plate 46 being connected to the positive lead 44 through relay 47.

The grid 48 of the tube $T_3$ is connected at a point 49 intermediate the two phototubes $T_1$ and $T_2$.

A capacitor $C_1$ is connected between the cathode 45 and grid 48 of the cold-cathode tube 23, and is therefore connected in parallel across the anode and cathode of phototube $T_1$. This capacitor serves primarily as a timing capacitor and will sometimes be referred to as such.

A second condenser $C_2$ is connected between the grid 48 and a voltage-divider 50, which in turn bridges the A. C. source. The voltage-divider supplies the condenser $C_2$ with alternating current of a voltage less than the A. C. line voltage, and, since the condenser $C_2$ acts in conjunction with the condenser $C_1$ to excite the cold-cathode tube $T_3$ into firing, the condenser $C_2$ will sometimes hereinafter be referred to as an exciter condenser.

A resistance R is shunted from the cathode 45 to the plate 46 of the cold-cathode tube $T_3$ through relay contacts 51, so that when the relay 47 is energized, the tube $T_3$ will cease conduction by reason of the shunting effect of resistance R. When the relay 47 is deenergized, the shunt circuit is open.

The phototubes $T_1$ and $T_2$ are preferably vacuum tubes of the photoemissive type and may, for example, be those which are known in the trade as type 929, made by the Radio Corporation of America at Harrison, New Jersey. They may be identical tubes, or may have different spectral characteristics, capacitance, sensitivity, etc., but, for convenience in discussion, it will be assumed that the two phototubes $T_1$ and $T_2$ are identical in all respects. It will be understood, however, that the tubes $T_1$, $T_2$, and $T_2'$ may be of the photoconductive type if desired.

The cold-cathode tube $T_3$ is a gas-filled tube of appropriate electrical characteristics, and may be a tube of the type known as 5823, manufactured by the Radio Corporation of America at Harrison, New Jersey.

The capacitor $C_1$ may be of 25 micro-microfarads, and the capacitor $C_2$ of 100 micro-microfarads. The resistance R may have a resistance of 3,700 ohms, and the voltage-divider 50 preferably is tapped to provide a potential of approximately 20 to 25 volts on the capacitor $C_2$. The rectifier 42 may be a 75 milliampere rectifier, with the cooperating capacitor $C_3$ having a capacitance of 8 microfarads.

All of the above specific description of the components of the circuit are purely illustrative and should not be considered in a limiting sense.

The theory of operation of the circuit is that the phototubes $T_1$ and $T_2$ being connected in series across the D. C. line 43 and 44 will at all times tend to have equal currents therethrough.

Obviously, as the light flux falling on the two phototubes $T_1$ and $T_2$ varies, the voltage across the tubes will vary, setting up new current conditions, and, for convenience and explanation, the light flux initially falling on the cathode of tube $T_1$ will be designated $F_1$, and the light flux initially falling upon the cathode of tube $T_2$ will be designated $F_2$.

As will hereinafter be more fully explained by reference to the graphical solution of equations in Figure 5, whenever the light intensity $F_1$ falls below the light intensity $F_2$ (assuming identical tubes $T_1$ and $T_2$), the voltage across the electrodes of tube $T_1$ tends to rise, but since timing capacitor $C_1$ is connected across these electrodes and across the grid to cathode of tube $T_3$ the voltage cannot rise instantaneously and current will flow into the capacitor $C_1$ until such time as the capacitor $C_1$ builds up a voltage sufficient to start grid current flowing between the cathode 45 and grid 48. When this takes place, the ionization of the gas in tube $T_3$ continues rapidly to cause conduction in the tube between cathode 45 and plate 46, which thereby energizes the relay 47, closes contacts 51, which then shunt the resistance R across the cathode and plate of tube $T_3$, to thereby stop the conduction through tube $T_3$, the value of resistance R being sufficient for this purpose.

Conversely, assuming that the circuit is again in its initial "off" state with the relay 47 deenergized, should the value of light intensity $F_1$ rise instead of fall, this would result in the voltage across phototube $T_1$ dropping, and there would be no tendency to deliver current to the condenser $C_1$.

It should be understood that in order to maintain the circuit in its "off" position (once it is in that position), light intensity $F_1$ should exceed light intensity $F_2$ so that a given drop of the light intensity $F_1$ will cause actuation of the circuit; whereas, a rise in light intensity $F_1$ will not, as heretofore explained. It should also be understood that the condenser $C_1$ requires a certain amount of time to become charged when current is flowing to it, which action gives stability to the circuit and provides any desired time lag between changes of illumination and actuation of the relay 47. Obviously, the value of condenser $C_1$ may be changed to provide the desired time lag.

The exciter condenser $C_2$ imposes an alternating wave upon the D. C. voltage of condenser $C_1$, and it has been found empirically that this imposed wave excites the tube $T_3$ into conduction at prescribed voltages far more readily than is the case when the condenser $C_2$ is omitted.

GRAPHICAL ANALYSIS OF CIRCUIT
(SEE FIGURE 5)

Figure 5:
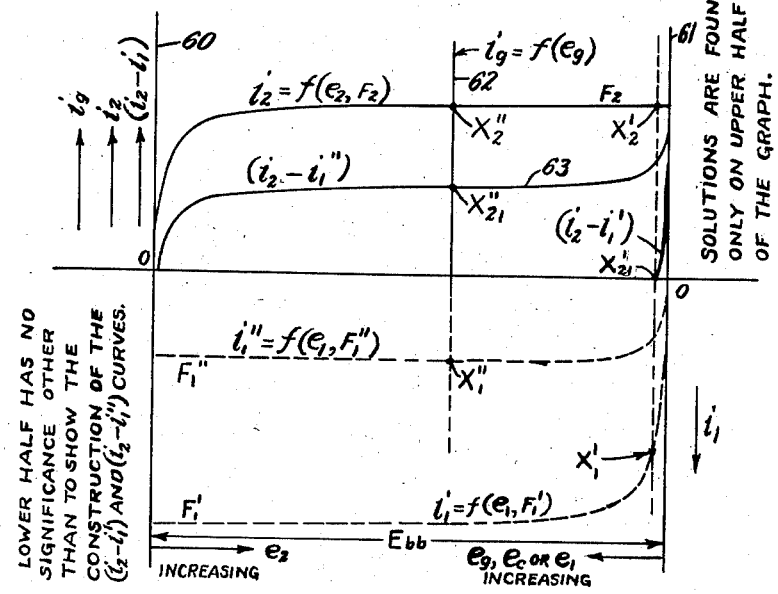
Figure 5 is a graphical solution of equations which is also helpful to an understanding of the invention.

It is convenient in solving the equations relating to this circuit to use graphical means, and this is shown in Figure 5. The equations are given below:

(1) $e_g = e_c 1 = e_1$ ------ By identity
(2) $(e_1 + e_2) = E_{bb}$ ------ Kirchhoff's voltage law
(3) $(i_g + i_{c_1}) = (i_2 - i_1)$ ------ Kirchhoff's current law
(4) $i_1 = f(e_1, F_1)$ ------ Phototube characteristic
(5) $i_2 = f(e_2, F_2)$ ------ Phototube characteristic
(6) $i_g = f(e_g)$ ------ Gas triode grid characteristic in which $e_g$ = grid voltage
$e_{g(m)}$ = mean grid voltage at time of firing
$e_c 1$ = voltage across $C_1$ condenser
$e_1$ = voltage across phototube $T_1$
$e_2$ = voltage across phototube $T_2$
$i_1$ = current through phototube $T_1$
$i_2$ = current through phototube $T_2$
$i_{c_1}$ = current to condenser $C_1$
$i_g$ = grid current
$E_{bb}$ = D. C. voltage
$F_1$ = light flux incident upon phototube $T_1$
$F_2$ = light flux incident upon phototube $T_2$ all of which are indicated in so far as possible on Figure 4 and the graph of Figure 5.

Perpendicular to the horizontal axis o—o, two vertical lines 60 and 61 are drawn a distance $E_{bb}$ apart corresponding to the input D. C. voltage. Voltages are represented along the base line o—o and currents are represented along the vertical axis. The light flux striking phototube $T_2$ is assumed constant and is represented by the notation $F_2$. The light flux initially incident upon phototube $T_1$ is assumed greater than $F_2$ and will be represented by the notation $F_1'$, and later this flux is reduced to a smaller value $F_1''$, this value being smaller than $F_2$.

With the initial light flux $F_1'$ falling on phototube $T_1$, which value is greater than the light flux $F_2$ falling on phototube $T_2$, the solution of the equations may be represented by the point $x_{21}'$, it being understood that no solution of the equation can exist below the base line. This means that $i_g$ and $i_{c_1}$ are zero, and that $i_1$ equals $i_2$, with values that may be represented by points $x_1'$ and $x_2'$. The solution of the equations under these conditions is found at the point that the curve $(i_2 - i_1')$ crosses the $i_g$ line 62 (which represents the mean grid firing voltage of tube $T_3$), or the base line o—o, in the event that it crosses the base line o—o first.

When the light flux incident upon phototube $T_1$ is decreased from $F_1'$ to $F_1''$, the solution of the equations may be represented by the point $x_{21}''$. However, $i_g$ is zero until $e_1$ becomes equal to the mean grid firing voltage of tube $T_3$. Therefore, the portion of the curve $(i_2 - i_1'')$, between the vertical broken line and the point $x_{21}''$ indicated by the reference character 63, constitutes the variation of $i_{c_1}$ with $e_c$ (or its equivalent $e_1$); and, since $i_{c_1}$ is a function of $e_c$, $C_1$ and time, this portion of the curve represents the transient solution of the equations. For any $e_c$ or $e_1$, the phototube currents can be easily found; when $e_1$ equals the mean grid firing voltage of tube $T_3$, the currents $i_2$ and $i_1''$ are represented by the points $x_2''$ and $x_1''$.

From all of this, it will be seen that:

1. Firing of the tube $T_3$ will take place only when $i_1$ is less than $i_2$, or assuming identical phototubes, only when the light incident upon phototube $T_1$ is less than the light incident upon phototube $T_2$.

2. Almost the entire supply voltage exists or tends to exist across that phototube having the least amount of light incident upon it (as indicated by the distance from axis 60 to the point $x_{21}'$, which is the voltage across the phototube having the least illumination; namely, phototube $T_2$. The same is true, regardless of the number of phototubes in series.

3. The timing condenser's charging current is approximately constant and is equal to the difference in the phototube currents represented by the ordinate $x_{21}''$.

4. The time required for the condenser $C_1$ to charge to a voltage $e_g$ equal to the mean grid firing voltage of $T_3$ may be represented approximately by the formula $$t = \frac{C_1}{i_{c_1}} e_{g(m)}$$

where $t$ is the time in seconds, $C_1$ is the capacitance of the condenser $C_1$ in microfarads, $i_{c_1}$ is the current in microamperes flowing into the condenser $C_1$, and $e_{g(m)}$ is the final voltage to which the condenser is to be charged to effect breakdown of the gas in the cold cathode tube $T_3$. From this formula, it will be seen that the time required for a given amount of current to effect breakdown in the cold cathode tube $T_3$ is directly proportional to the capacitance of condenser $C_1$, and hence the timing of the circuit may be very simply altered to suit conditions by merely varying the value of the capacitance $C_1$. To this end a variable condenser may be employed if desired.

REVERSE ACTION OF CIRCUIT AND RESETTING

Thus far, the description of the electrical circuit has been directed to its operation from an "off" state to "on" state, i. e., a change in the relationship between light fluxes $F_1$ and $F_2$ has caused sufficient current to flow to the condenser $C_1$ to actuate the cold cathode tube $T_3$ which in turn actuates the relay 47 to cause the resistance R to be shunted across cathode to plate circuit of the tube $T_3$. It will be understood, of course, that the relay 47 in effecting this shunting action may also control any external circuits that are desired.

The problem now is to provide means for obtaining the reverse action, namely, changing the circuit from an "on" state to an "off" state, and also to reset the circuit for subsequent operation from an "off" state.

It should be clear from the description of the circuit thus far, and the theoretical explanation and the graphical analysis of the circuit's equations, that firing of the control tube $T_3$ takes place whenever sufficient voltage is developed across the condenser $C_1$, and that this occurs after the light flux $F_1$ falls with respect to light flux $F_2$. Obviously, the same effect is obtained when light flux $F_2$ increases with respect to light flux $F_1$ and it is the relative value of these two light fluxes that determines the operation of the circuit.

If now we assume that the circuit of Fig. 4 is in the "on" stage, i. e., with the relay 47 energized and the resistance R is shunted across the tube $T_3$, the problem is to restore the circuit to its initial "off" state, causing relays to operate if desired in response to this change of circuit condition and reset the circuit for subsequent operation from the "off" stage to the "on" stage. (This is accomplished by the circuit shown in Figs. 6, 7, 8, 9 and 10—these figures showing different relay arrangements for effecting the desired control of the circuit.)

Broadly, this is accomplished by providing a cold cathode tube $T_4$, a condenser $C_1'$ and a condenser $C_2'$ which may be similar in all respects to the cold cathode tube $T_3$, condenser $C_1$ and condenser $C_2$ of the portion of the circuit already described. Obviously, the electrical characteristics of these components may be varied as desired to provide certain desired operating characteristics. For the purpose of this explanation, these components will be assumed to be duplicates of the corresponding elements of the partial circuit already described.

The phototubes $T_1$ and $T_2$ (Fig. 6) are associated with the control tube $T_4$, condenser $C_1'$ and condenser $C_2'$ in precisely the same manner as in the partial circuit previously described, with the exception that the anode of the phototube $T_2$ is connected to the grid of the control tube T₄ through a resistance $R_g'$, and the cathode of the phototube T₂ is connected through relay circuits hereinafter described to the cathode of the control tube T₄. Similarly, the cathode of phototube T₁ is connected to the grid of control tube T₄ and the anode of phototube T₁ is connected through relay circuits hereinafter described to the plate or anode of tube T₄. All of this means that the phototube T₂ is now connected in the cathode to grid circuit of the control tube which, in this instance, is cold-cathode tube T₄, whereas in the partial circuit previously described, it was the phototube T₁, the voltage of which appeared across the cathode to grid circuit of the control tube which in that instance was cold-cathode tube T₃.

The condensers $C_1'$ and $C_2'$ are associated with the tube T₄ and the phototubes T₁ and T₂ in precisely the same manner as the corresponding condensers $C_1$ and $C_2$ were associated with control tube T₃ and phototubes T₁ and T₂. The capacitance of $C_1'$ can of course be varied to control the amount of time between the increasing of light flux F₁ and the conduction of tube T₄. This will become apparent as the relay circuits are described.

It will be noted in Figures 6, 7, 8, 9 and 10 that resistances $R_g$ and $R_g'$ are interposed in the series connections between the phototubes T₁ and T₂, and these resistances serve the purpose of preventing a short circuit across the power source. When the tube T₃ is the controlling tube, that is, in carrying the circuit from "off" state to "on" state, the resistance $R_g'$, which preferably is on the order of 100,000 ohms effectively prevents a short circuit across the power source since the cathode of tube T₁ and anode of tube T₂ are connected directly across the negative and positive leads 43 and 44 of the power source. Similarly, when the cold-cathode tube T₄ is functioning as the control tube for shifting the circuit from "on" state to "off" state, the resistance $R_g$, which may also have a resistance on the order of 100,000 ohms, prevents a short circuit across the power source because in this instance, the anode of phototube T₁ and cathode of phototube T₂ are connected across the D. C. leads 44 and 43 respectively.

Although the resistances $R_g$ and $R_g'$ are effective in preventing a short circuit across the power source, they do not interfere with the phototube current in effecting the desired control of the circuit since the voltage drop across these resistances will be negligible for the small phototube currents that are involved in the circuit.

The condensers $C_1$ and $C_1'$ serve two other functions besides that of acting as timing condensers in effecting the build-up of the grid voltage on tubes T₃ and T₄. In order to permit the grid of the cold-cathode tube to initiate plate current flow the external grid to cathode impedance must be below a certain value, which value is dependent upon the tube characteristics. When the impedance is sufficiently low the amount of current flowing between the grid and cathode of the cold-cathode tube will be adequate to create enough ionization within the tube to transfer the discharge to the plate. Another requirement to effect this transfer of the discharge is that sufficient current flow between the grid and cathode continue for at least a minimum amount of time, which time is also determined by the characteristics of the tube. Thus it will be seen that the condensers $C_1$ and $C_1'$ serve not only as timing condensers, but also as appropriate impedance elements and reservoirs for electric charge to meet the requirements of the cold-cathode tubes T₃ and T₄.

Obviously, rectifiers or other types of unidirectional conductors could be substituted for the resistances $R_g$ and $R_g'$, but the resistances are preferred in most instances because of their low cost.

RELAY CIRCUITS

There are various ways in which relay circuits may be adapted to exercise the control desired in setting up the "off" and "on" states of the circuit. These are shown in Figures 6, 7, 8 and 9.

A. Multiple relay circuit—Figure 6

Figure 6:
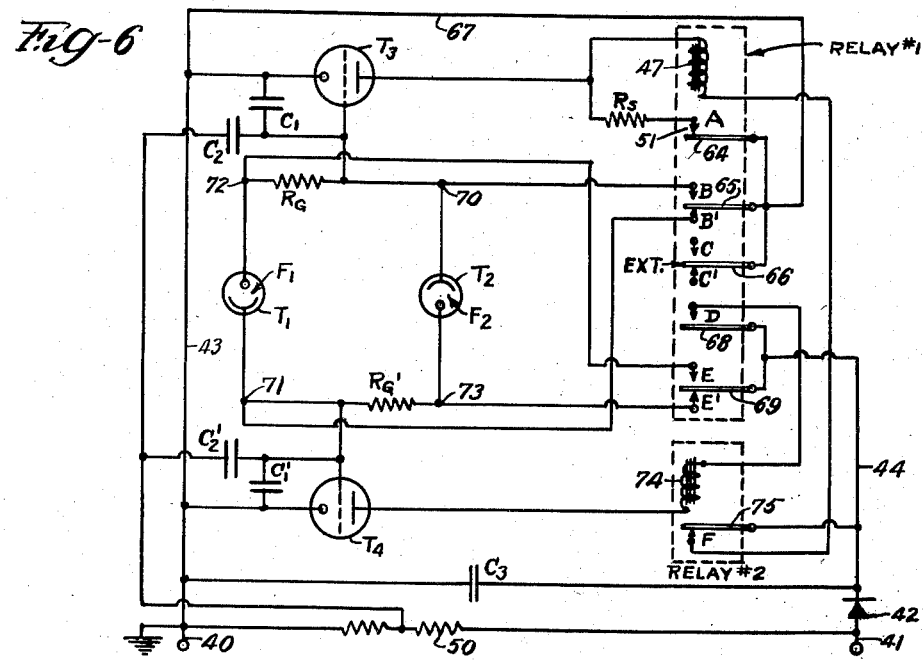

In Figure 6, two separate relays are used and are designated on the drawing as relay No. 1 and relay No. 2. Relay No. 1 corresponds to relay 47 of Figure 4 with the addition of several relay arms. Relay arms 64, 65, and 66 are all connected to the negative D. C. lead 43 through a conductor 67 and relay arms 68 and 69 are connected to the positive D. C. lead 44. The front contact A merely serves to shunt the resistance Rs across the cathode to plate circuit of control tube T₃ when the tube fires to cause energization of relay 47.

The front and back contacts B and B', respectively, associated with the relay arm 65 serve to place the negative potential on points 70 or 71, respectively, in the series connection between the phototubes T₁ and T₂ and to short out the condensers $C_1$ and $C_1'$, respectively, so that either timing condenser will have zero voltage across its terminals when it becomes the active timing condenser.

The front and back contacts C and C' associated with the relay arm 66 may be connected to any external circuit that it is desired to have controlled from the circuit of this invention.

The front contact D associated with the relay arm 68 serves to place positive potential on the plate of control tube T₄ when control of the circuit is to be shifted to T₄.

The front and rear contacts E and E', respectively, associated with the relay arm 69 merely serve to place the positive D. C. lead 44 in contact with the points 72 or 73, respectively, in the series phototube circuit when the control tube of the circuit is either T₄ or T₃.

Relay No. 2 has a coil 74 that is in series with the contact D associated with the relay arm 68 so that the coil is energized whenever tube T₄ fires. A back contact F cooperates with a relay arm 75 to remove positive potential from the relay 47 whenever relay No. 2 is energized, the result being that when tube T₄ fires, the circuit is reset to its initial "off" state condition.

From the above, it will be clear that firing of the tube T₃ caused by a reduction in light flux F₁ relative to light flux F₂ operates relay No. 1 which changes the connections on the phototubes T₁ and T₂ to associate those tubes with control tube T₄ instead of control tube T₃, so that a subsequent minimum increase in the value of light flux F₁ relative to light flux F₂ will cause tube T₄ to fire, thereby energizing relay No. 2 to restore the entire circuit to its initial "off" state condition and readying it for subsequent response to a fall in light flux F₁ relative to F₂.

One advantage of the relay circuit shown in Fig. 6 is its high speed operation. Tests have shown that with types of relays readily available on the open market, the circuit may be made to respond as rapidly as 20 cycles a second without difficulty. Obviously, with faster relays and by proper selection of the other components of the circuit, this speed of operation may be increased.

It will also be noted that the control tubes T₃ and T₄ are energized only for the instant that they are required to operate to effect a transition of the circuit from "off" state to "on" state and vice versa. In the case of tube T₃, the resistance Rs is shunted across the tube T₃ as soon as the relay 47 is energized, and in the case of tube T₄, the energization of the relay coil 74 caused by the firing of the tube T₄ deenergizes relay No. 1, which in turn removes the voltage from the tube T₄ and stops conduction. Tubes T₃ and T₄ may therefore be expected to have almost limitless life.

B. Single relay, multiple coils—Fig. 7

In the form of the invention shown in Fig. 7, a single relay 76 is employed having opposed operating coils 77 and 78 mounted on a common core. Associated with the relay are a number of relay arms and contacts which are similar in all respects to the correspondingly numbered and lettered relay arms and contacts shown in Fig. 6, with the exception that the relay arm 68 and its associated contact D is in series with the coil 78 of the relay 76 rather than the coil of a separate relay. It will be seen that when the coil 77 is energized to raise the relay arms associated with it, the closing of contact D with relay arm 68 places positive potential on the plate of the tube $T_4$ through the relay coil 78 so that when $T_4$ fires, the relay coil 78 is energized and nullifies the effect of coil 77, thereby permitting the relay arms to drop. When the arms fall to their lower positions as shown in Figure 7, the circuit is in its initial "off" state and reset for normal operation.

Preferably a condenser $C_d$ and resistance $R_d$ are connected in series across the relay coil 77 to serve as a shunt circuit to dissipate the energy that is present in relay coil 77 whenever the circuit through the coil is broken.

The use of a shunt circuit across the relay coil 77 to dissipate the inductive energy of that coil when the circuit through the coil is open is of importance in preventing inadvertent firing of tube $T_3$ because of the high voltage that would normally appear between the contact A and relay arm 64 when the relay arm falls, and which voltage would consequently appear across the cathode to plate of the tube $T_3$.

Assuming an inductance for coil 77 on the order of 45 henrys and a resistance of 5000 ohms, it is satisfactory to use a capacity for condenser $C_d$ of two microfarads and a 5000 ohm resistor for the resistance $R_d$. These values for the condensers $C_d$ and resistance $R_d$ are chosen so that the voltage developed across the resistance $R_d$ when coil 77 discharges will not be sufficient to fire tube $T_3$, while the condenser prevents any appreciable current flow through resistance $R_d$ while the coil 77 is energized.

The relay arrangement shown in Figure 7 has the advantage that only one relay is used and yet it still possesses the high speed operating characteristics that are found in the relay arrangement of Figure 6.

Obviously, the relay coil 78 may be given any desired number of ampere turns to effectively overcome the magneto-motive force of the relay coil 77, and if desired, may have sufficient ampere turns to overbalance the magneto-motive force of coil 77 to make release of the relay arms more positive.

One advantage of the relay arrangement in Figure 7 over that shown in Figure 6 resides in the fact that potential across the control tube $T_3$ is maintained at all times so that the possibilities of relay failure in establishing the potential across the tube at the desired times is eliminated. It should be noted, however, that tubes $T_3$ and $T_4$ are maintained in their conducting states only momentarily when the circuit is being changed from "off" state to "on" state or vice versa, so that the life of the tubes will be almost limitless.

C. *Single relay with single coil—Figures 8 and 8a*

In the circuit shown in Figure 8, a still further simplification of the relay arrangement is shown, and in this case, the relay, generally designated 79, has a relay coil 80 with which are associated a number of contacts and relay arms of which contacts B and B', C and C', E and E', with their corresponding relay arms 65, 66, and 69 correspond to the similarly lettered and numbered relays and contact arms of Figure 6, and therefore need not be further described. The relay 79 also has an arm 81 which is connected to the positive lead 44 of the D. C. voltage source, but through a resistance $R_z$. The contact G associated with the relay arm 81 is connected to the plate of tube $T_4$ through a lead 82.

The relay coil 80 has shunted across it a condenser $C_d$ in series with a resistance $R_d$ as in Figure 7, but these components serve slightly different functions as will hereinafter appear. For the purposes of explaining this circuit, it will be convenient to illustrate the operation of the circuit with a given value of D. C. voltage and certain values for the components of the circuit. Let us assume, therefore, that the D. C. voltage across the leads 43 and 44 is 140 volts; that the tubes $T_3$ and $T_4$ cannot continue conduction unless there is at least 60 volts between cathode and plate; that the voltage drop across relay coil 80 when current is flowing through tube $T_3$ is 60 volts; and the voltage drop across resistance $R_z$ when current is flowing through tube $T_3$ is 20 volts.

It will therefore be seen that, starting with the circuit in its normal "off" state, when sufficient voltage is built up in condenser $C_1$ to fire the tube $T_3$, the relay coil 80 is energized, the voltage across tube $T_3$ immediately drops from 140 volts to 60 volts, 60 volts is dropped across the coil 80 and the remaining 20 volts appear across $R_z$ due to the current flow therethrough. Upon energization of the relay coil 80, the relay arm 81 is placed in contact with contact G to place 120 volts across the tube $T_4$. As soon as the light flux $F_2$ on tube $T_2$ falls sufficiently to fire tube $T_4$, the voltage across tube $T_4$ necessarily falls to 60 volts (its so-called extinction voltage representing the voltage normally across the tube while conducting, and below which it cannot continue to conduct). However, when this voltage drop occurs, we have a condition in which the tubes $T_4$ and $T_3$ are in parallel relation as can readily be traced by considering the points 83 and 84 as the parallel connecting points. Since in this state of the circuit, the voltage across tube $T_4$ is only 60 volts, whereas the voltage across the tube $T_3$ with its series coil 80 is 120 volts, the coil will immediately discharge through condenser $C_d$ and resistance $R_d$. The values of this condenser and resistance may be selected so that when this discharge takes place, a counter E. M. F. will be developed, which will reduce the voltage across tube $T_3$ to some value below 60 volts, thereby causing it to stop conduction. When tube $T_3$ stops conduction, the relay coil 80 immediately de-energizes, thereby dropping the relay arms and placing the circuit in its initial "off" state and reset for subsequent operation.

Instead of using a tube $T_4$ that has identical characteristics with tube $T_3$, it may be selected to have an extinction voltage that is below that of tube $T_3$ say, for example, 55 volts. In such a case, the shunt circuit paralleling the coil 80 may be omitted because firing of the tube $T_4$ will immediately reduce the voltage across tube $T_3$ below its extinction voltage and cause it to cease conducting.

Obviously, from the above description it will be seen that tubes $T_3$ and $T_4$ may not be identical tubes and may vary in characteristics, and that the shunt circuit around the coil 80 may in some instances be eliminated due to the values selected in the other parts of the circuit.

The resistance $R_z$ serves the important function of preventing excessive current from flowing through $T_4$ when it is conducting.

Since the resistance $R_z$ has a 20 volt drop across it when the tube $T_3$ is conducting and the relay arm 81 is in contact with contact G, only 120 volts is across the tube $T_4$ prior to its conduction. The sensitivity of the tube $T_4$ is, therefore, changed with respect to tube $T_3$ which has 140 volts across its terminals prior to conduction. It is therefore desirable to provide a means for operating the tube $T_4$ at the same potential as tube $T_3$ during the detection stage, and this may be accomplished by the circuits shown in Figure 8a. In this figure, only the pertinent portions of the circuit of Figure 8 are shown, and it will be seen that a parallel circuit is established between the points 85 and 86 with the resistance $R_z$ and a rectifier 87 appearing in one branch of the circuit, and a resistance $R_y$ and a rectifier 88 appearing in the other branch.

The resistance $R_y$ is preferably of a high resistance, for example, on the order of 100,000 ohms, while the resistance of $R_z$ may be on the order of 1,400 ohms. Obviously, the point 86 in the circuit is at the same voltage as point 85 when tube $T_4$ is nonconducting, and since point 85 is at the potential of the D. C. source, the tube $T_4$ will have the full 140 volts across its terminals prior to conduction.

The rectifier 87 prevents the potential of point 86 from being applied to the coil 80, thereby permitting the resistance $R_z$ to remain in series with coil 80 and tube $T_3$.

When tube $T_4$ is fired, current will flow through the two branch circuits previously mentioned, and since $R_y$ is of relatively high resistance as compared to that of $R_z$, the major portion of the current flow to the two tubes $T_3$ and $T_4$ will be through the resistance $R_2$. This network now permits a voltage drop of 80 volts, thereby allowing 60 volts to exist across the tube $T_4$.

D. *Single relay with thyratron control—Figure 9*

In the form of the invention shown in Figure 9, the cold-cathode tubes $T_3$ and $T_4$ are interrelated with a thyratron control circuit. A single relay 89 is used having an operating coil 90 that is connected between the positive lead 44 of the D. C. voltage source and the plate of tube $T_3$. The relay arms 65, 66 and 69 with their associated contracts B, B', C, C' and E, E', respectively, correspond in function to the similarly numbered and lettered relay arms and contacts of the circuit shown in Figure 6, and need not further be described.

The relay 89 also has an arm 91 associated with a front contact H which is adapted to connect the plate of tube $T_4$ with the positive lead 44 of the D. C. source through a resistance 92, this resistance being a part of the so-called parallel thyratron control circuit. The other component of the parallel thyratron control circuit comprises a condenser 93 which is connected in series with the resistance 92 so that the resistance 92 and condenser 93 are in parallel with the coil 90 of the relay 89. It will also be seen that the condenser 93 is connected between the plates of tubes $T_3$ and $T_4$ when the relay 89 is energized to place relay arm 91 in contact with the contact H.

Again, it will be convenient in explaining this circuit to assume that tubes $T_3$ and $T_4$ are identical tubes; that the voltage across the D. C. power input is 140 volts; and that the extinction voltage of tubes $T_3$ and $T_4$ is 60 volts. With these assumptions, the circuit can be analyzed by first considering the circuit in its "off" state, at which time it will be observed that the tube $T_3$ is connected directly across the D. C. power input and the total D. C. voltage of 140 volts appears accross the cathode to plate of that tube. When a sufficient charge builds up on condenser $C_1$ (due to a fall in the light intensity $F_1$ with respect to the light intensity $F_2$) to cause the tube $T_3$ to fire, the relay coil 90 becomes energized, lifting the relay arms and placing positive potential on the plate of tube $T_4$ through the resistance 92, relay arm 91 and contact H. The firing of tube $T_3$ reduces the potential across that tube from 140 volts to 60 volts, and the remaining 80 volts appears across the relay coil 90. Since the resistance 92 and condenser 93 are connected in parallel across the coil 90, the condenser 93 will charge up to a voltage equal to that of the coil 90; namely, 80 volts, although the building up of this voltage will be delayed slightly due to the effect of resistance 92.

After the circuit has reached stabilization to the extent that the condenser 93 is fully charged, the tube $T_4$ will have 140 volts across its terminals, and when the light flux $F_2$ falls sufficiently to fire the tube $T_4$ (or the light flux $F_1$ increases with respect to light flux $F_2$), the voltage across tube $T_4$ will be reduced to 60 volts by the firing of the tube, with the remaining 80-volt drop in potential appearing across the resistance 92.

The lowering of the voltage on tube $T_4$ to 60 volts by the firing of that tube necessarily changes the voltage across tube $T_3$ from 60 volts positive potential on the plate with respect to the cathode to −20 volts on the plate with respect to the cathode, since the condenser 93 was charged to a voltage of 80 volts with a polarity such as to make this change in the tube voltage inevitable. Obviously when this changed voltage condition on tube $T_3$ takes place, the tube immediately stops conducting, causing relay coil 90 to be deenergized and the entire circuit to be returned to its initial "off" condition.

Whether tube $T_3$ actually reaches a voltage of −20 volts on the plate with respect to the cathode is really immaterial because as soon as the voltage drops below 60 volts, the tube is extinguished.

In Figure 9a, a slightly different arrangement of the circuit is shown, in this case eliminating completely the relay arm 91 and contact H so that the plate of tube $T_4$ is continuously connected to the positive D. C. lead 55 through resistance 92, which causes control tube $T_4$ to conduct at all times that the circuit is in its "off" stage. The circuit is otherwise the same as in Figure 9.

When the circuit is going from the "on" state to the "off" state, it operates identically with the circuit of Figure 9 except that tube $T_4$ is not extinguished by the opening of a contact but continues to conduct, when when the tube $T_3$ is to be fired to change the circuit from the "off" state to the "on" state, the function of the circuit is slightly different. In the "off" state, the resistance 92 has an 80-volt drop across it due to the current flowing through it to tube $T_4$, which causes the condenser 93 to have a charge of 80 volts which is opposite in polarity to that which it assumes when the circuit is in the "on" state. Since the condenser is charged in this opposite direction, the tube $T_3$ now becomes the control tube and causes the voltage on the other tube, in this case tube $T_4$, to drop sufficiently to stop conduction, thereby placing it again under the control of its grid for response to changes in light conditions which will cause tube $T_4$ to fire.

The relay circuits of Figures 9 and 9a are very simple and the relay structure is correspondingly simple. It is not, however, as fast in its action as some of the other circuits previously described.

E. *Use of third phototube to obtain different levels for "on" and "off" operation—Figure 10*

There may be some circumstances under which it is desirable to provide a differential control of the "on" and "off" states. In other words, it may be desirable to have the circuit change from its "off" state to its "on" state at one level of illumination, and from its "on" state to "off" state at some substantially different level, assuming that one of the phototubes is to be used as a standard. This can readily be accomplished by the use of a third phototube which may be paralleled with either the non-standard phototube, i. e., the phototube that is being subject to the varying light conditions, or the standard phototube.

There are various ways in which this result may be accomplished, and one of these is shown in Figure 10.

Referring now to this figure, it will be seen that the circuit is identical with the circuit shown in Figure 6, with the exception that a phototube $T_2'$ is provided to cooperate with the phototube $T_2$ in establishing the desired levels of "off" and "on" illumination response.

The tube $T_2'$ in the illustrative embodiment of the invention shown in Figure 10 is shown connected with its cathode at ground potential and the anode connected at the point 94 in the series phototube circuit.

When the circuit is in its "off" state so that the tube $T_3$ is acting as the control tube for changing the circuit to its "on" state when the light intensity of $F_1$ falls a sufficient amount, the point 94 is at ground potential because the relay arm 65 is in contact with contact B', which places this part of the circuit in direct electrical communication with the lead 43 constituting the negative grounded side of the direct current source. Hence, in this state of the circuit, the phototube $T_2'$ has no function because both sides of the tube are connected to ground.

When tube $T_3$ fires to energize relay 47, the negative potential is taken off of points 94 and 71 and placed at point 70, with the results that tubes $T_2'$ and $T_2$ are placed in parallel relationship since resistance $R_g'$ may be disregarded at the low phototube currents that are involved.

Since phototubes $T_2'$ and $T_2$ are acting in parallel, they serve to pass more current for a given illumination $F_2$ than either one would pass alone, with the result that the amount of light flux $F_1$ falling on tube $T_1$ must increase a correspondingly greater amount in order to cause the circuit to shift from its "on" state to its "off" state; i. e., by the firing of tube $T_4$. In this manner, a different level of illumination has been provided for effecting the change of the circuit condition from "off" to "on" than the level of illumination required for changing the circuit condition from "on" to "off."

Two of the three phototubes (i. e. $T_2$ and $T_2'$) may conveniently be located side by side at one end of a chassis arrangement such as shown in Fig. 1 with a suitably enlarged window means, in the position of the window 30 for example, to accommodate two phototubes, side by side, for the modified control purposes last above described in view of Fig. 10.

It will be understood that the principle underlying the use of the third phototube consists in having both sides of the third phototube at the same potential in one state of operation of the circuit, so that in effect it is completely inactive, whereas when the control of the entire circuit is shifted from one of the control tubes to the other control tube $T_3$ or $T_4$, as the case may be, the change in location at which the potential is applied to the series phototube circuit automatically brings the third phototube into action by paralleling it with one or the other phototube.

To the extent that different levels of illumination may be established for "on" and "off" control by the use of a third phototube to the same extent may different spectral responses be used to control "on" and "off" operation in a like manner.

USES OF CIRCUITS

Obviously, the circuits which have heretofore been described have a wide variety of uses, as for example, illumination control, counting, photometric comparisons, temperature controls and the like. These will be apparent to those skilled in the art.

PHYSICAL EMBODIMENT OF THE INVENTION

The several circuits heretofore described may be variously embodied in physical structure, and a preferred embodiment of one of the circuits is shown in Figures 1, 2 and 3. The particular circuit and relay arrangement, which is shown in these figures, is taken from Figure 7 of the drawings, in which a single relay is used with opposed coils acting upon the armature.

It is convenient to have the phototubes 20 and 21 mounted at the ends of the chassis 22 and facing outwardly, so that they may be exposed to their respective light fluxes $F_1$ and $F_2$ through the windows 29 and 30 of the cover 28. The relay 25 is preferably mounted on the chassis intermediate the tubes 20 and 21, with the coils located above the chassis, and with the contacts located in the space between the top of the chassis 22 and the shelf 26. Since the chassis 22 and the shelf 26 are preferably made of iron, they serve to shield various parts of the circuit, both magnetically and electrostatically. The control tubes 23 and 24 being mounted on the chassis 22 with the bases extending into the space between the chassis top and the shelf 26 are advantageously shielded from the power supply 27 which is located beneath the shelf 26, and the power supply 27 is well removed from the relay contacts and the electrodes of the two phototubes.

It should be noted in Figure 2 that sockets 96 and 97 are provided at each end of the chassis 22 for connection to the A. C. power supply and the circuits to be controlled, and preferably these sockets are paralleled so that either socket may receive the power and external circuit plug, which is generally indicated at 98 in Figure 1. Since the cover 28 may not be removed without removing the plug 98, this provides a safety feature for the device.

Preferably the entire unit is electrostatically and electromagnetically shielded by the cover, which may be made of a plastic material having a metal foil inner surface, so that the exterior thereof is non-conducting while the inner surface thereof has the desired shielding properties.

I claim:

1. In a photoelectric circuit, the combination of a source of D. C. electric potential having negative and positive leads, a cold-cathode tube having cathode, grid and plate elements with the cathode and plate elements connected to said negative and positive leads, respectively, a pair of photocells connected in series across said source, in parallel with the cold-cathode tube, and with the anode of the first cell being connected to the cathode of the second cell and to said grid element of the cold-cathode tube, and with the cathode of said first cell and the anode of the second cell connected to the negative and positive leads, respectively, of said D. C. source, and a timing condenser connected between the cathode and grid of the cold-cathode tube and adapted to have a voltage built up thereon in response to an increase in the current flow through said second cell as compared with that flowing through said first cell, whereby the cold-cathode tube is fired when said voltage on the timing condenser reaches a predetermined value.

2. In a photoelectric circuit, the combination of a source of D. C. electrical potential having negative and positive leads, a cold-cathode tube having cathode, grid and plate elements with the cathode and plate elements connected to said negative and positive leads, respectively, a pair of photocells connected in series across said source, in parallel with the cold-cathode tube, and with the anode of the first cell being connected to the cathode of the second cell and to said grid element of the cold-cathode tube, and with the cathode of said first cell and the anode of the second cell connected to the negative and positive leads, respectively, of said D. C. source, a timing condenser connected between the cathode and grid of the cold-cathode tube and adapted to have a voltage built up thereon in response to an increase in the current flow through said second cell as compared with that flowing through said first cell, whereby the cold-cathode tube is fired when said voltage on the timing condenser reaches a predetermined value, and an exciter condenser having one side thereof connected to the grid of said cold-cathode tube and the other side thereof connected to an A. C. voltage source.

3. In a photoelectric circuit, the combination of a source of D. C. electrical potential having negative and positive leads, a cold-cathode tube having cathode, grid and plate elements with the cathode and plate elements connected to said negative and positive leads, respectively, a pair of photocells connected in series across said source, in parallel with the cold-cathode tube, and with the anode of the first cell being connected to the cathode of the second cell and to said grid element of the cold-cathode tube, and with the cathode of said first cell and the anode of the second cell connected to the negative and positive leads, respectively, of said D. C. source, a timing condenser connected between the cathode and grid of the cold-cathode tube and adapted to have a voltage built up thereon in response to an increase in the current flow through said second cell as compared with that flowing through said first cell, whereby the cold-cathode tube is fired when said voltage on the timing condenser reaches a predetermined value, and an exciter condenser having one side thereof connected to the grid of said cold-cathode tube and the other side thereof connected to an A. C. voltage source substantially less than the voltage of said D. C source.

4. In a photoelectric circuit, the combination of a source of D. C. electrical potential having negative and positive leads, a cold-cathode tube having cathode, grid and plate elements with the cathode and plate elements connected to said negative and positive leads, respectively, a pair of emission type photocells connected in series across said source, in parallel with the cold-cathode tube, and with the anode of the first cell being connected to the cathode of the second cell and to said grid element of the cold-cathode tube, and with the cathode of said first cell and the anode of the second cell connected to the negative and positive leads, respectively, of said D. C. source, a timing condenser connected between the cathode and grid of the cold-cathode tube and adapted to have a voltage built up thereon in response to an increase in the current flow through said second cell as compared with the flowing through said first cell, whereby the cold-cathode tube is fired when said voltage on the timing condenser reaches a predetermined value, and arresting means for stopping conduction through said cold-cathode tube after it has fired, said arresting means including an impedance and means for shunting same across the plate circuit of the cold-cathode tube in response to current flow through the plate circuit of said tube.

5. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second emissive photocells connected in series and each having an anode and cathode with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, and control means for selectively appplying said D. C. potential from said positive lead across one or the other of said electrical elements, and to the plate of one or the other of said cold-cathode tubes, negative D. C. potential from said source being connected to the cathode of said cells and tubes.

6. In a photoelectric circuit, the combination of a source of D. C. electrical potential having negative and positive leads, first and second cold-cathode tubes each having cathode, grid and plate elements, a timing condenser connected between the grid and cathode of each such tube, an exciter condenser connected between the grid of each such tube and a source of A. C. potential, a photocell circuit comprising first and second emissive-type photocells connected in series, and each having at least an anode and a cathode with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, and control means for selectively applying positive D. C. potential from said source across one or the other of said electrical elements, and to the plate of one of the other of the cold-cathode tubes, negative potential from said source being connected normally to the cathodes of said cells and tubes.

7. In a photoelectric circuit, the combination of a source of D. C. electrical potential having negative and positive leads, first and second cold-cathode tubes each having cathode, grid and plate elements, a timing condenser connected between the grid and cathode of each such tube, an exciter condenser connected between the grid of each such tube and a source of A. C. potential, a photocell circuit comprising first and second photocells, each having at least an anode and a cathode and connected in series with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, a third photocell having an anode and a cathode respectively connected in parallel with the corresponding elements of one of the other two photocells to provide differential control of the photoelectric currents through said photoelectric circuit during at least a portion of the time that said photoelectric circuit is operative, and control means for selectively applying positive D. C. potential from said source across one or the other of said electrical elements, and to the plate of one or the other of said cold-cathode tubes, negative potential from said source being connected to the cathodes of all of said photocells and cold-cathode tubes.

8. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second emissive-type photocells connected in series and each including at least an emitter-cathode and an anode, with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, and control means for selectively applying said D. C. potential across one or the other of said electrical elements, and connecting the positive aspect of said potential to the plate of either the first or second of the cold-cathode tubes, said control means comprising a first relay having a current-operated control element in the plate circuit of the first cold-cathode tube, a second relay having a current-operated control element in the plate circuit of the second cathode tube, switching means actuated by said first relay for selectively effecting said application of D. C. potential to said electrical elements and for controlling the application of D. C. potential to said second tube, and additional switching means actuated by the control element of said second relay for controlling the application of D. C. potential to said first tube.

9. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second photocells each having an anode and a cathode, the anode of one cell being connected in series with the cathode of the second cell and the grid of said first tube connected to the cathode of said second cell and the grid of said second tube connected to the cathode of said first cell, said grids also being connected with the anodes of the other cells, respectively, through electrical means characterized by having negligible voltage drop thereacross at photocell currents but acting as current limiters to relatively large voltages applied thereacross, and control means for selectively applying said D. C. potential across one or the other of said electrical means, and D. C. operating potential from said source to the elements of the cold-cathode tubes, said control means comprising a first relay having a current-responsive control element in the plate circuit of the first cold-cathode tube, a second relay having a current-responsive control element in the plate circuit of the second cathode tube, switching means actuated by said first relay for effecting said application of D. C. potential to said electrical means and for controlling the application of said D. C. operating potential to said second tube, said switching means also controlling the connection and disconnection of an arresting means in shunt with the plate circuit of said first tube, and additional switching means actuated by the current-responsive control element of said second relay for controlling the application of said D. C. operating potential to said first tube.

10. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second photocells respectively having an anode and a cathode and connected in series, anode to cathode, with the grid of said first tube connected to the cathode of said second cell and the grid of said second tube connected to the cathode of said first cell, said grids also being connected with the anodes of the other cells, respectively, through current-limiting means characterized by having negligible voltage drop across their terminals at predetermined photocell currents but acting as current limiters when relatively large voltages are applied across their terminals, together with control means including a relay having coil means connected for actuation by tube current and cooperable relay switch means connecting D. C. operating potential from said source to the plate of one said cold-cathode tube responsive to operation of said relay by the other said tube.

11. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second photocells connected in series with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, and control means comprising a relay having opposed coils, one of said coils being in the plate circuit of said first tube and the other coil being in the plate circuit of said second tube, switching means controlled by said relay for effecting said selective application of said D. C. potential to said electrical elements and for controlling the application of D. C. operating potential from said D. C. source to said tubes through said opposed coils, and means for dissipating the inductive energy of one of said relay coils when said switching means is opened.

12. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second photocells connected in series with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, and control means comprising a relay having opposed coils, one of said coils being in the plate circuit of said first tube and the other coil being in the plate circuit of said second tube, switching means controlled by said relay for effecting said selective application of D. C. operating potential from said source to said electrical elements and for controlling the application of D. C. operating potential to the anodes of said tubes through said opposed coils, and means for dissipating the inductive energy of one of said relay coils when said switching means is opened, said dissipating means including a resistance and a capacitance connected in series across said one relay coil.

13. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second photocells connected in series with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, control means for selectively applying D. C. operating potential from said source across one or the other of said electrical elements, and to the cold-cathode tubes, said control means comprising a relay having its coil connected in the plate circuit of one of said cold-cathode tubes, switching means controlled by said relay coil for effecting said selective application of D. C. operating potential to said electrical elements and for controlling the application of D. C. operating potential to said other phototube, and a resistance interposed in the plate circuit of both tubes for controlling the value of the D. C. potential applied to said phototubes.

14. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second photocells connected in series with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, control means for selectively applying D. C. operating potential from said source across one or the other of said electrical elements, and to the elements of the cold-cathode tubes, said control means including a relay having an operating coil connected in the plate circuit of one of said cathode tubes, switching means controlled by said relay coil for effecting said selective application of D. C. operating potential to said electrical elements and for controlling the application of D. C. operating potential from said source to said other cathode tube, a resistance interposed in the plate circuit of both said tubes for controlling the value of the D. C. operating potential applied to said cathode tubes, and means for dissipating the inductive energy of said relay coil when the voltage across it is changed, said means including a condenser and resistance connected in series across said coil.

15. In a photoelectric circuit, the combination of a source of D. C. electrical potential having negative and positive leads, first and second cold-cathode tubes each having cathode, grid and plate elements, a timing condenser connected between the grid and cathode of each such tube, a photocell circuit comprising first and second photocells connected in series with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, control means for selectively applying D. C. operating potential from said source across one or the other of said electrical elements, and to the cold-cathode tubes, said control means including a relay having an actuating coil connected in the plate circuit of one of said cold-cathode tubes, switching means controlled by said relay coil for effecting said selective application of said D. C. operating potential to said electrical elements and for controlling the application of said D. C. operating potential to said other phototube, a resistance interposed in the plate circuit of both tubes for controlling the value of the D. C. operating potential applied to said phototubes, a second resistance interposed in the plate circuit of said second tube only, and a unidirectional current means between each of said two last-named resistances and the plate of said second tube, said unidirectional current means being in parallel with each other.

16. In a photoelectric circuit, the combination of a source of D. C. electrical potential having negative and positive leads, first and second cold-cathode tubes each having cathode, grid and plate elements, said negative D. C. potential being connected to said cathodes, a timing condenser connected between the grid and cathode of each such tube, a photocell circuit comprising first and second photocells connected in series with the grid of said first tube connected to the cathode of said second cell and the grid of said second tube connected to the cathode of said first cell, said grids also being connected with the anodes of the other cells, respectively, through electrical elements characterized by having negligible voltage drop across their terminals at photocell currents but acting as current limiters when relatively large voltages are applied across their terminals, control means for selectively applying said positive D. C. potential to the grid-connected terminals thereof to act across one or the other of said electrical elements, and to the plates of the cold-cathode tubes, said control means including a relay with relay contacts connected for controlling the distribution of D. C. potential to said cold-cathode tubes as aforesaid, said relay having at least one winding connected in series with the plate of one of said cold cathode tubes.

17. In a photoelectric control circuit, at least two emission-type photocells each having an anode and a cathode, said cells being mutually connected in series, the anode of one to the cathode of the other; at least two cold cathode relay tubes of a type adapted to be fired from an "off" to an "on" condition and each having a firing grid, a cathode, and an anode; means for applying a D. C. operating potential to act across the anodes and cathodes of said photocells; circuit means connecting each of said grids of the relay tubes to the cathode-anode circuit of one of said photocells for derivation therefrom of a firing voltage to trigger the appertaining relay tube from "off" to "on" condition responsive to change in the condition of the photoelectric current in the appertaining photocell; a source of D. C. operating potential adapted for connection across the cathode and plate elements of the relay tube; additional relay means including coil means connected with said relay-tube operating potential for actuation responsive to changes in relay-tube anode current attending transitions from "off" to "on" and "on" to "off" condition in said tubes; relay switch means normally connecting said tube-operating potential to act across the cathode-anode circuit of only a certain one of said relay tubes and actuated by said additional relay means responsive to firing of said certain tube to shift said connection of operating potential to act across the cathode-anode elements of the other relay tube; said switch means further including connections for limiting the anode current of the fired relay tube to restore the latter to "off" condition following firing of same to "on" condition and attendant actuation of the additional relay means as aforesaid.

18. In a photoelectric control circuit, a plurality of emission-type photocells each having an anode and a cathode, at least two of said cells being mutually connected in series, the anode of one to the cathode of the other; at least two cold cathode relay tubes of a type adapted to be fired from an "off" to an "on" condition and each having a firing grid, a cathode, and an anode; means for applying a D. C. operating potential to act across the anodes and cathodes of said photocells; circuit means including a protective current-limiting device connecting each of said grids of the relay tubes to the cathode-anode circuit of one of said photocells for derivation therefrom of a firing voltage to trigger the appertaining relay tube from "off" to "on" condition responsive to change in the condition of the photoelectric current in the appertaining photocell; a source of D. C. operating potential adapted for connection across the cathode and plate elements of the relay tubes; additional relay means including coil means connected in series with said relay-tube operating potential for actuation responsive to changes in relay-tube anode current attending transitions from "off" to "on" and "on" to "off" condition in said tubes; relay switch means normally connecting said tube-operating potential to act across the cathode-anode circuit of only a certain one of said relay tubes and actuated by said additional relay means responsive to firing of said certain tube to shift said connection of operating potential to act across the cathode-anode elements of the other relay tube; said switch means further including connections for limiting the anode current of the fired relay tube to restore the latter to "off" condition following firing of same to "on" condition and attendant actuation of the additional relay means as aforesaid together with capacity means shunted across the grid and cathode of each relay tube; a source of alternating voltage of predetermined magnitudes; and circuit means connecting said alternating voltage through series capacity to act across the grid and cathode of each relay tube.

19. In a photoelectric control circuit, at least two emission-type photoelectric cells each having an anode and a cathode, said cells being mutually connected in series, anode to cathode; at least two cold cathode relay tubes each having an anode, a cathode, and a firing grid for triggering the tube from "off" to "on" condition; and means applying a D. C. operating potential to act across the cathode-anode elements of the series-connected photocells and to the cathode and plate elements of said relay tubes; current-limiting circuit means connecting each of said grids of the relay tubes to the anode-cathode circuit of one of said photocells for derivation therefrom of a firing voltage responsive to change in conditions of photoelectric current therein; additional relay means connected to be operably controlled by relay-tube anode current, together with circuit connections controlled by said additional relay means for limiting the anode current of any relay tube triggered as aforesaid to the "on" condition to restore same to "off" condition.

20. In a photoelectric control circuit, at least two emission-type photoelectric cells each having an anode and a cathode, said cells being mutually connected in series, anode to cathode; at least two cold cathode relay tubes each having an anode, a cathode, and a firing grid for triggering the tube from "off" to "on" condition; and means applying a D. C. operating potential to act across the cathode-anode elements of the series-connected photocells and across the cathode and plate elements of said relay tubes; current-limiting circuit means connecting each of said grids of the relay tubes to the anode-cathode circuit of one of said photocells for derivation therefrom of a firing voltage responsive to change in conditions of photoelectric current therein; additional relay means connected to be operably controlled by relay-tube anode current, together with circuit connections controlled by said additional relay means for limiting the anode current of any relay tube triggered as aforesaid to the "on" condition to restore same to "off" condition, and a sensitizing circuit for at least one of said relay tubes and including a source of alternating voltage connected to act across the cathode-grid elements of said relay tube through a series capacity whereby to apply an alternating voltage continuously to said grid.

21. A photoelectric control circuit comprising at least two photo-emissive type photocells each having an anode and a cathode; a source of D. C. operating potential connected to act across the anode and cathode elements of a first one of said cells to provide an anode current responsive to photo excitation of said cell, the anode and cathode of the second one of said cells being connected in series with said operating potential and said elements of the first cell; a first voltage-operated relay tube having an anode, a cathode, and a control electrode operable by applied firing voltage to trigger the relay from an "off" to an "on" condition in which there is a substantial flow of anode current; circuit means connecting the control electrode of said relay tube to the anode of said first photocell to derive a triggering voltage therefrom as a function of change in photo-excited anode current of said cell to fire said relay tube to "on" condition; current-operated relay means including coil means connected to be actuated by relay-tube anode current and relay switch means actuated by said coil means from a normal condition to an off-normal condition; a source of operating voltage connected by said relay switch means in said normal condition to provide anode current in said first relay tube in its "on" condition and to actuate said coil means of the current-operated relay means; an extinguishing circuit connected by said relay switch means in off-normal condition to effectively extinguish the anode current in said first relay tube and restore the latter from "on" to "off" condition; said control circuit further including a second relay tube substantially identical to said first relay tube and having a control electrode connected to the anode of said second photocell to derive a firing voltage therefrom, together with circuit connections controlled by said relay switch means in off-normal condition thereof for connecting D. C. operating potential to act across the anode-cathode elements of said second tube to render the latter operable by said second photocell following actuation of the relay coil as aforesaid; and circuit connections with the anode circuit of said second relay tube for causing operation of said current-operated relay means to restore the same from off-normal to normal condition by a component of anode current derived from operation of said second relay tube in "on" condition.

22. Photoelectric circuitry operable in a duty cycle from a normally "off" to an "on" condition, and comprising a space-current type of photocell including an anode and a cathode; means for connecting a unidirectional operating potential to act across said anode and cathode to produce an anode current responsive to light-excitation of said cell; an electron relay having at least a cathode, an anode, and a control electrode, and adapted to be fired from an "off" to an "on" conducting condition by trigger voltage applied to said electrode; means for connecting a unidirectional operating potential to act across said anode and cathode of the relay tube; circuit means connecting said control electrode with the anode circuit of said photocell for derivation and application of trigger voltages to said control electrode responsive to changes in space current through said cell; a first capacity shunted across the control electrode and cathode of said relay tube; a source of alternating voltage of peak magnitude insufficient of itself to fire said relay tube connected to act through a second capacity across said control electrode and cathode of the electron relay; and current-operated relay means including an operating coil therefor connected in the anode circuit of said electron relay for actuation responsive to flow of anode current therein in the "on" condition of said relay; said current-operated relay means including switching contact means actuated thereby for controlling a plurality of circuits at least one of which is connected with circuit means for shunting the electron path between said cathode and anode of the electron relay and reducing said anode current in "on" condition to a value corresponding to the "off" condition without interrupting the operating current through said relay coil; together with light-actuated releasing means for said current-operated relay means to terminate said duty cycle and including additional photo-sensitive means and appertaining relay means controlled thereby and making circuit connections with said coil to change the operating current therethrough responsive to predetermined photoelectric excitation of said additional photoelectric means, and current flow produced by operation of the appertaining relay means whereby said first-mentioned photocell, said electron relay means, and said current-operated relay means are restored to a condition of readiness for another duty cycle, as aforesaid.

23. In a photoelectric circuit, a space-current type of photoelectric cell having an anode and a cathode; means for connecting a D. C. operating potential to act across said anode and cathode to produce a change in anode current responsive to a change in photo-excitation of said photocell; positive D. C. operating voltage connected to the anode of said cell and having its negative terminal connected to the cathode of said cell; a cold-cathode relay tube having a control electrode, an anode, and a cathode; positive D. C. operating voltage connected to said tube anode and having its negative terminal connected to said tube cathode; two capacitors connected in series and having their common juncture connected to said control electrode with the remaining terminal of one capacitor connected to said tube cathode and the remaining terminal of the other capacitor connected to one terminal of a source of alternating voltage the remaining terminal of which is connected to said tube cathode, the value of the alternating voltage acting across said control electrode and tube cathode being at all times insufficient of itself to fire said relay tube.

24. The circuit according to claim 23 in which said D. C. voltage applied to the tube anode is derived from rectifying means in circuit with said alternating voltage, and said alternating voltage acting across the control electrode and tube cathode is derived from said source of alternating voltage through a voltage dividing means in circuit with said alternating voltage source.

25. In a photoelectric control circuit for "on" and "off" operation, first and second photoelectric cells of the emission type connected for series operation by D. C. operating potentials applied thereto and producing current flow through that one of said cells which is excited for photo emission; first and second cold-cathode relay tubes each including a firing electrode and an anode and cathode, together with means applying a D. C. operating potential to an anode-cathode circuit for at least one of the tubes to produce an anode-cathode current therein in "on" condition responsive to firing of the tube by a trigger voltage applied to the control electrode thereof; circuit means connecting with said photocells for deriving a triggering voltage from each of the same as a function of change in photoelectric current therein and for applying said triggering voltages respectively to the firing electrodes of one or the other of said relay tubes to fire the same to "on" condition; switching means including relay coil means connected for energization by anode-cathode current passed by at least one of said relay tubes in "on" condition; relay switch means actuated by energization and deenergization of said coil means; and circuit connections controlled by said relay switch means and the cooperation of said second photocell and one of said relay tubes in firing the latter to "on" condition for effecting a change in the flow of energizing current through said relay coil means, produced by firing of the first relay tube, to effectively deenergize said coil means and also to change the anode-cathode current of said first relay tube to a value corresponding to "off" condition, said relay switch means including connections controlled thereby for changing the application of said D. C. operating potential from the first relay tube to the second and vice versa responsive to the firing of either said tube to "on" condition.

26. In a photo-sensitive control apparatus, a cold-cathode electron relay tube including a firing electrode, an anode and a cathode with suitable uni-directional operating potential connecting to the latter two elements to produce an anode-cathode current when the tube is fired to "on" condition by application of a firing potential to said firing electrode; a photo-sensitive firing means for said relay tube and including a firing circuit connected with a photoelectric cell and in which a flow of current is varied responsive to changes in photo-excitation of said cell; circuit means connecting with said photoelectric cell firing circuit for deriving therefrom a firing potential as a result of current variations therein, as aforesaid, and for applying said firing potential to said firing electrode to fire the relay tube; together with exciting means for said relay tube including an alternating potential connected to act across the firing electrode and cathode of the relay tube through an electrostatic capacity.

27. In a control circuit, a cold-cathode type relay tube including at least a firing electrode, an anode, and a cathode; means applying a D. C. operating potential to act across said anode and cathode to produce an anode-cathode current flow responsive to application of a predetermined minimum firing potential across the control electrode and cathode of said tube to start said flow; a firing circuit connecting with said tube firing electrode and cathode for applying said minimum firing potential, at least, thereto; and an exciting circuit connecting an alternating voltage to act across said firing circuit through an electrostatic capacity in series with said alternating voltage; said alternating voltage being of a peak value insufficient of itself to fire said relay tube.

28. In a photoelectric control circuit which includes a cold-cathode type of electron relay tube including a control electrode, an anode, and a cathode, and a photoemissive, space-current type of photocell having an anode and a cathode, and means connecting said control electrode and cathode of the relay tube with a direct-current anode-cathode circuit for said photocell at points at varying potential therein for derivation of unidirectional firing voltage therefrom as a function of change in the anode current in said cell, improvements for sensitizing said electron relay comprising, to wit: a source of alternating voltage and circuit means connecting therewith for applying an alternating voltage of effective value to act across said control electrode and the appertaining cathode of the relay tube, but insufficient of itself to fire said electron relay tube, said circuit means including a capacity in series with said applied alternating voltage.

29. In a photoelectric control circuit for differential "on" and "off" operation, at least three emission type photocells each having an anode and a cathode; circuit connections normally connecting two of said cells in series with an operating potential for producing anode-cathode currents therein responsive to changes in light energy to which said cells are exposed; relay means normally disposed in an "off" condition and connected for actuation by one of said series cells to an "on" condition; circuit means controlled by said relay means in "on" condition for restoring the same to "off" condition under control of the second one of said series photocells; circuit means controlled by said relay means in said "on" condition for connecting the third one of said photocells in parallel, anode to anode and cathode to cathode, with the said second series photocell, said parallel-connected cells having operating characteristics differing from those of said first series-connected cell such that a different level of light energy is required to effect the operation of said parallel-connected cells for the aforesaid restoring operation thereof than is required for the operation of the first said series-connected cell to effect the aforesaid "on" operation of the relay means.

30. A photoelectric circuit including a plurality of photoelectric cells and relay means controlled thereby for alternately setting up series and parallel connections of certain of said cells to render the same effectively responsive to different levels of illumination, said circuit comprising: a normal series circuit including at least two photoelectric cells connected for operation in series responsive to excitation by illumination of a first predetermined degree; a parallel restoring circuit including at least two photoelectric cells connected for operation in parallel responsive to excitation by illumination of a second predetermined degree; relay means operable to first and second conditions together with relay circuits controlled thereby in both conditions thereof; one of said relay circuits in the first condition effectuating circuit connections rendering said normal circuit operable to actuate said relay means to the second condition under control of photoelectric currents derived from said series-connected cells responsive to excitation of the latter by requisite first-degree illumination; another of said relay circuits in the second condition of operation of the relay means effectuating connections rendering said restoring circuit effective to further actuate said relay means and restore same to said first condition thereof under control of photoelectric currents derived from said parallel-connected cells responsive to excitation of the latter by requisite second-degree illumination to thereby again render said normal circuit effective.

References Cited in the file of this patent

UNITED STATES PATENTS

| 1,812,764 | Story | June 30, 1931 |
| 1,851,236 | Baseler et al. | Mar. 29, 1932 |
| 2,059,786 | Gilbert | Nov. 3, 1936 |
| 2,140,368 | Lyle | Dec. 13, 1938 |
| 2,154,500 | Elmendorf | Apr. 18, 1939 |
| 2,168,994 | Kelley | Aug. 8, 1939 |
| 2,237,950 | Pineo | Apr. 8, 1941 |
| 2,278,920 | Evans et al. | Apr. 7, 1942 |
| 2,481,667 | Holden | Sept. 13, 1949 |
| 2,509,497 | Hesson | May 30, 1950 |
| 2,594,514 | Sweet | Apr. 29, 1952 |
| 2,607,872 | Enabnit | Aug. 19, 1952 |
| 2,617,048 | Wagner et al. | Nov. 4, 1952 |